March 2, 1943.    P. A. BRICK    2,312,871
BODY TIPPING APPARATUS FOR MOTOR VEHICLES
Filed Dec. 4, 1941    3 Sheets-Sheet 1
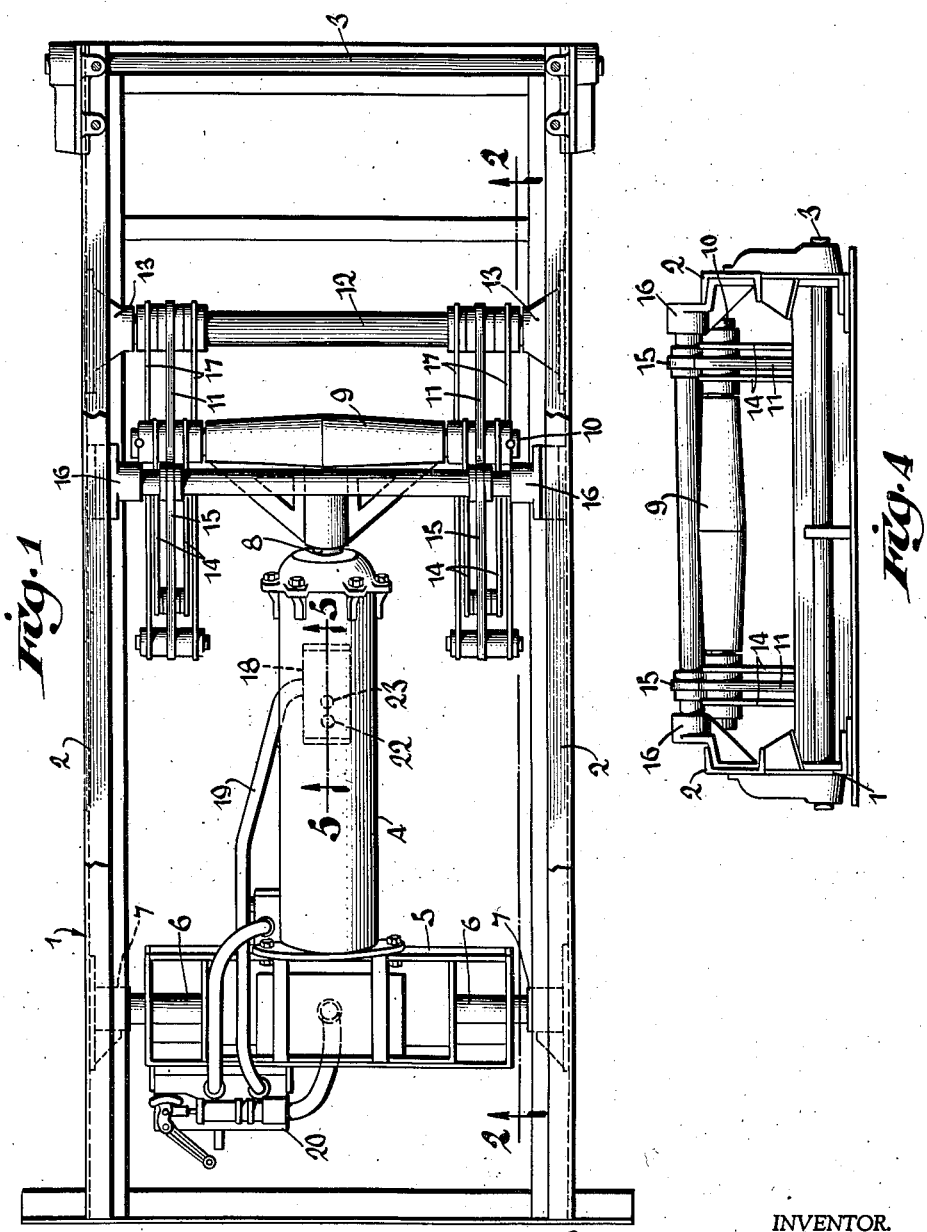
INVENTOR.
Perry A. Brick
BY
ATTORNEY.

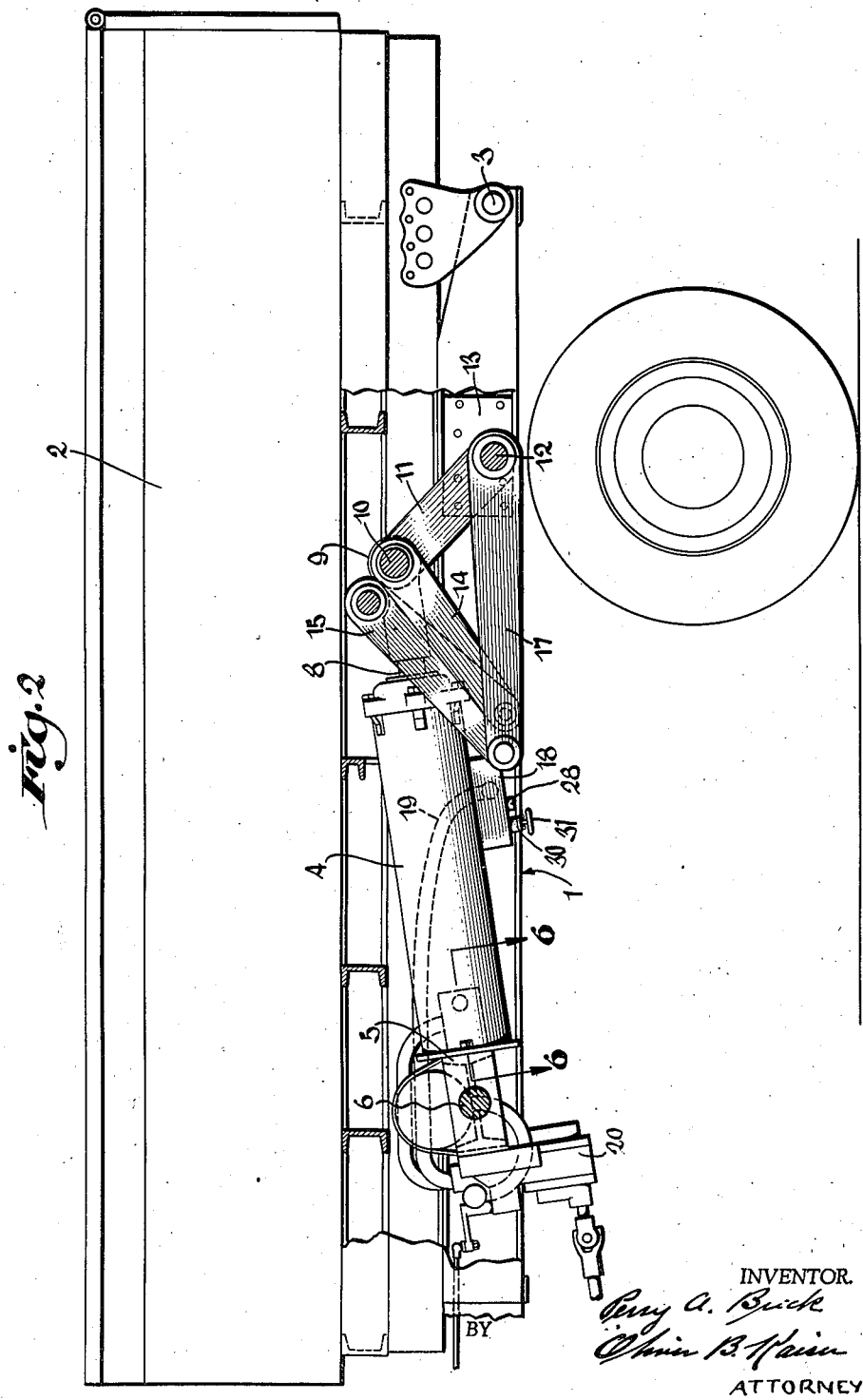

March 2, 1943.  P. A. BRICK  2,312,871
BODY TIPPING APPARATUS FOR MOTOR VEHICLES
Filed Dec. 4, 1941  3 Sheets-Sheet 3
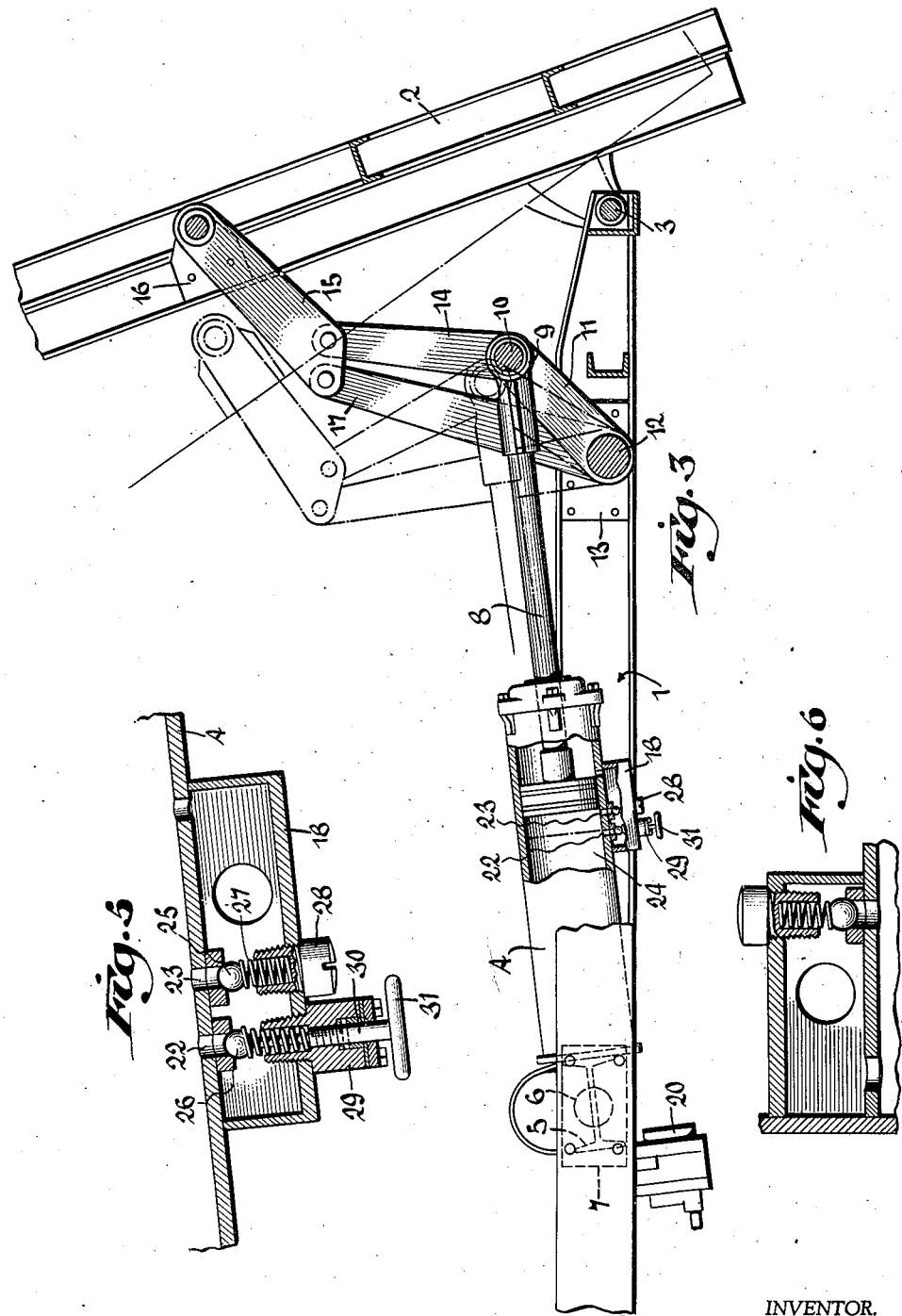
INVENTOR.
BY Perry A. Brick,
Olivia B. Kaiser
ATTORNEY.

Patented Mar. 2, 1943

2,312,871

UNITED STATES PATENT OFFICE 2,312,871

BODY TIPPING APPARATUS FOR MOTOR VEHICLES

Perry A. Brick, Galion, Ohio, assignor to The Perfection Steel Body Company, Galion, Ohio, a corporation of Ohio Application December 4, 1941, Serial No. 421,636

10 Claims. (Cl. 298—22)

This invention relates to improvements in hoists of the hydraulic type primarily for tipping the dumping bodies of motor vehicles or trucks in which the power cylinder for the dump body tipping is in an approximately horizontal position and pivotally mounted at one or rear end to the chassis or frame of the motor vehicle, and having the ram of the power cylinder coupled to a system of linkage and the linkage coupled to the underside of the tipping body and to the chassis.

The invention particularly relates to a system of linkage connecting the ram of the power cylinder to the underside of the tipping body providing greater body travel with the same length of ram stroke without an increase in fluid pressure or ram force for tipping the body to the normal dumping angle over the prevailing methods employing a lever and link system for the lift.

An object of the invention is to provide a lift composed of a system of links for obtaining an increased degree of body tipping angle over the lever and link methods heretofore employed for the same degree of ram stroke without increase in hydraulic pressure or to lessen the length of ram stroke for obtaining a normal body tipping angle, thereby either affecting a shorter stroke hoist or a greater degree of dumping angle.

Another object of the invention is to provide a simple and efficient operating linkage between the fluid operated ram or piston and the dumping body arranged in duplicate sets at relative opposite sides of the power cylinder for equalization, and the links of each set relatively in a symmetrical arrangement for smooth operation and avoiding distortion and twist.

Various other features and advantages will be more fully set forth in the description of the accompanied drawings, in which:

Figure 1 is a top plan view of a truck chassis equipped with the improved hydraulic hoist mechanism.

Figure 2 is a sectional view taken on line 2—2, Figure 1, illustrating the body and chassis of a motor truck equipped with the present apparatus, with the body in its normal horizontal position.

Figure 3 is a fragmentary side elevation partially in section showing the hoist mechanism and dump body in its extreme tipping angle and likewise showing the same in dot and dash lines in a secondary, decreased angle, tipping position as determined by the control valve setting.

Figure 4 is an end elevation of the chassis and hoist linkage.

Figure 5 is a sectional view taken on line 5—5, Figure 1, detailing the by-pass control valve for determining the limits of ram travel.

Figure 6 is a sectional view taken on line 6—6, Figure 2, detailing the intake ports at the forward end of the ram cylinder.

Referring to the drawings, 1 indicates a portion of the motor vehicle chassis or to a hoist frame conveniently fixed thereto usually including longitudinal side beams or rails to which the hoist is mounted. The vehicle chassis and hoist frame are of conventional type and in structural detail follow the standards adopted by various motor truck or vehicle manufacturers, and are adapted for convenient installation of a hoist and dump body, therefore detailed description of the truck chassis and hoist frame will be omitted herein. This also follows for the detail construction of the dump body 2 having a hinge connection 3 at its rear end to the rear end of the hoist frame.

A hydraulic cylinder 4 is disposed longitudinally and centrally of the hoist frame, preferably mounted upon a journaled cross head 5. The cross head 5 at each of its opposite ends has a trunnion 6 extended therefrom relatively coaxial, and each is journaled within a bracket 7 fixed to a relative side beam or rail of the hoist frame. The cylinder extends approximately in a horizontal line and is provided with a piston rod or ram 8 traversing the rearward head of the cylinder and connects with a piston reciprocable within the cylinder. The outer end of the ram is coupled to the medial portion of a cross head 9, generally of T-form, with the body portion thereof of sleeve or tubular form for supporting and carrying a cross rod or axle 10, having its opposite ends projected beyond the opposite ends of the sleeve for making a pivotal coupling to a pair or plural sets of link lift systems to the ram, one set or system at each of the opposite ends of the cross head or sides of the ram to effect a balanced condition.

The hoist preferably provides a pair of link systems and each may be referred to as a link lift interveningly connecting the hydraulic power unit with the dump body and the chassis or hoist frame for tilting the dump body in a forward or power stroke of the ram, and as the link systems are the duplicate of one another, a detailed description thereof will be confined to the singular.

The lift linkage comprises a link 11, at one end pivotally connected to one end of the axle or spindle 10 of the ram cross head 9 and its opposite end is pivotally mounted upon a spindle or axle 12. The axle 12 extends crosswise of the hoist frame between the main longitudinal rails or beams thereof and has its opposite ends each respectively mounted within a bracket 13 fixed to a relative longitudinal side rail or beam of the vehicle frame. The pivotal connection of the link 11 to the hoist frame is at a location to the rear of the power cylinder and at a position below the longitudinal axle of the power cylinder and its ram. The link, therefore, in a lowermost or down position of the dump body, lies or extends normally at an angle of approximately 45° from a horizontal plane, and for an extreme power stroke of the ram for tilting the body to an approximately 70° angle, moves its ram connecting end about its stationary fulcrum or axis of revolution in an arc so as to extend in an opposite direction at approximately the same degree of angle as it lies in its normal position when the dump body is down, thereby requiring a minimum degree of power for a return starting movement when the dump body is tilted to approximately a 70° dumping angle.

A pair of companion links 14—14 located respectively at relative opposite sides of the link 11 at one end are pivotally connected or coupled to the axle or spindle 10 of the ram cross head and at their opposite end are pivotally connected to the lower end of a dump body coupling link 15 and at relative opposite sides thereof. The double links 14—14 in the down position of the dump body extend downwardly at an obtuse angle to the link 11 or in a relative alternate angular direction therefrom or from the joint pivotal connection of the links 11 and 14—14 upon the cross head of the ram. The body coupling link 15, as a single link, at its upper end and opposite its connection with the double links 14—14, pivotally connects with a bracket 16 fixed to the underside of the dump body 2 at an appropriate distance forward from the rear hinge connection of the dump body to the frame.

The lower end of the dump body connecting link 15, at a point spaced from or eccentric to the pivotal connection of the double links 14—14 therewith, pivotally connects with the free end of a pair of companion links 17 respectively disposed at relative opposite sides of the single link 15 and spaced therefrom to clear the double links 14—14 which in the normal position of the linkage, when the body is in a lowered position, have their ends connecting with the link 15 disposed between the double links 17. The double links 17 are pivotally connected to the cross bar or axle 12 respectively at relative opposite sides of the link 11 pivotally connecting with said axle 12.

The assembly of linkage is such that the forces and their points of application are at the start of a lifting stroke somewhat similar to the conventional hoist employing a triangular or scalene triangle lift lever wherein the dump body coupling link pivotally connects to one end of the hypotenuse or base of the triangular lever, while the opposite end of the lever at the base is pivoted to the supporting frame, and the ram pivotally connects to the top of the right angle of the lever and therefore intermediate of the connections of the triangular lever to the frame and to the link connecting with the dump body. In the present instance, the links 11, 14 and 17 in a normal position, when the dump body is down, relatively assume a position to form a scalene triangle. The links 14, however, being connected to the link 15, are offset or eccentric from the connection of the link 15 with the links 17. The triangular formation of the links 11, 14 and 17 is disrupted or altered in a lifting stroke so that the end of the link 15 connecting with the links 14 and 17 diverts the triangular formation in a lifting movement of the links to develop a formation of a quadrilateral or trapezoid, thereby producing a greater tilting movement of the body. The system of linkage thereby produces a greater body travel for the same ram stroke over the triangular lever type without requiring any greater oil pressure or piston force. As a matter of fact, there is less pressure required at all points up to about a 45° dumping angle, permitting the use of a shorter stroke hoist or to produce a greater dumping angle. The additional travel is used as a means of lifting the body to a 70° dumping angle in place of the usual 50° or 55°.

By the introduction of two or more by-passes in the upper end of the cylinder for limiting the power stroke of the ram, separate automatic controls can be maintained for tipping the body to either of various degrees of dumping angle, whichever is more desirable for different materials transported or dumping service.

The single links 11 and 15 are in a relatively aligned position, adapting the double links 14—14 arranged in parallelism to straddle the links 11 and 15 at one end with which they connect to the common axis with link 11 and at the opposite end with the lower end of link 15, while the links 17—17, outside of the links 14—14, also straddle the links 11 and 15, thereby effecting a symmetric arrangement eliminating torsional and twisting strains tending to retard freedom of linkage movement which would impose additional load upon the power unit. The linkage has no offside pivotal connection, so that more freedom and smoothness of pivotal action is obtained, all tending to lessen the power requirements.

The relative eccentric connection of the links 14 and 17 with the link 15 presents an extremely favorable condition over a concentric connection, requiring less pressure for elevating at all points up to about a 45° dumping angle to handle the same load with the same stroke.

The link 11 at its respective opposite ends, connecting with the ram as a movable point and with the frame as a stationary point, serves as a radius bar to limit and confine lateral movement of the ram, thereby substituting a stationary guide or slideway. The links 15 and 17 comprise a toggle and the connection of the draw or power connecting link 14 eccentric to the toggle joint provides an increase of tilting angle for the dump body over the prevailing lifts for a comparative maximum length of power stroke of the ram, and a decrease in length of power stroke for tilting the body to a lessor dumping angle.

The power unit, owing to the increased degree of dumping angle obtained by the linkage for a definite or determined length of ram travel, preferably is of a type having power available for both alternate directions of ram travel or stroke to accommodate for a starting return of the dump body when pitched to the excessive angle resisting a starting dump body descent by gravity. When the dumping angle need only be for the usual degree and at which the dump body can be started in descent by gravity, the pump unit may be of the single power stroke type, in which instance the linkage provides for a lessor length of power stroke.

To adapt the dumping unit for an automatic lifting control for various degrees of dumping angle, for example, say at 55° and at 70°, as shown in Figure 3, the cylinder of the power unit is provided with a plurality of by-passes at its upper end regulatable for a variable stroke length control.

It is a common expedient to provide the rear end of the power cylinder with a check valve control port communicating with a return or by-passage leading to the intake of the fluid pump of the power unit for automatically limiting the length of power stroke of the piston or ram. The piston toward the end of its power stroke uncovers a port for establishing communication between a chamber in the cylinder at one side of the piston and the return passage to the pump, relieving the pressure against the piston to arrest piston movement during continued operation of the pump and prior to effecting a reversing control. Accordingly, as illustrated in Figures 3, 5 and 6, a side of the power cylinder 4 toward its rear end is provided with a manifold 18 to which a return passage or conduit 19 connects leading to the intake of the hydraulic pumping apparatus 20 mounted upon the cross head or cradle 5 of the power unit. The cylinder has a pair of ports 22, 23 proportionately spaced longitudinally of the cylinder interconnecting the return passage through the manifold with a chamber 24 formed by the piston. The ports 22, 23 are each respectively controlled by spring urged check valves 25, 26 preferably of ball type. The spring 27 for the valve 25 is seated within a cup screw 28 fixed to and traversing the manifold for exterior access. The corresponding spring 27 for the valve 26 is seated within a cup screw 29 fixed to and traversing the manifold. The screw 29 axially carries a screw-threaded stem 30 adjustable by a hand wheel 31 to bring the stem into compressive engagement with the valve 26 to hold the valve to its seat or closed. The cup screws 28 and 29 are interchangeable for alternating the control of the valves.

Accordingly the operator may normalize the valves 26 for use in tilting the dump body for ordinary service at a dumping angle, say 55°, whereupon when he is trucking material requiring a greater degree of tilting angle for the body, the valve 26 may be locked to its seat or in closed position which affords a greater degree of piston travel before uncovering the port 23 for obtaining a dumping angle for the body, at say 70°. Therefore, upon introducing two or more by-passes at the upper end of the cylinder and providing all but the furtherest one with means for holding the valve closed, the tipping angle of the dump body can be selectively controlled for various dumping angles up to the limit of piston stroke and linkage.

Upon transfer of the means for holding the valve closed, it provides for a constant setting for a short piston stroke control which may be preferable when the material handled can be most advantageously discharged at a definite tilting angle of the dump body, or if the power unit is of a type in which the return stroke of the ram is by gravity, and with which the excessive dumping angle could not be advantageously employed, as power would be required for a return starting of the dump body.

Having described my invention, I claim:

1. In a motor vehicle including a frame and having a tiltable dump body pivotally mounted thereon, a hoist mechanism for tilting said body comprising: a pair of links in toggle arrangement pivotally connected together and having their opposite ends pivotally connected respectively to the frame and dump body, a power actuated connecting link having one end pivotally connected to said toggle link at a point eccentric to the axis of toggle joint thereof, power means including a reciprocable ram connected to said connecting link for actuating said toggle links to elevate the body, and a radius link having one end pivotally connected to the vehicle frame, and the opposite end to the axis pivotally coupling said connecting link to the ram of said power means.

2. In a motor vehicle including a frame and having a tiltable dump body pivotally mounted thereon, a hoist mechanism for tilting said body comprising: a pair of links in toggle arrangement pivotally connected together and having their opposite ends pivotally connected respectively to the frame and dump body, a power actuated connecting link having one end pivotally connected to said toggle link at a point eccentric to the axis of toggle joint thereof, power means including a reciprocable ram connected to said connecting link for actuating said toggle links to elevate the body, and means movably connecting the head end of the ram of said power means to the vehicle frame.

3. In a motor vehicle including a frame and having a tiltable dump body pivotally mounted thereon, a hoist mechanism for tilting said body comprising: a pair of links in toggle arrangement pivotally connected together and having their opposite ends pivotally connected respectively to the frame and dump body, a second pair of links in toggle arrangement, having their opposite ends pivotally connected respectively to the frame and to the link of the first toggle eccentric to the axis of the toggle joint, and power means mounted on said vehicle frame including a reciprocable ram connected to the toggle joint of said second pair of links.

4. The combination of a frame of a motor vehicle having a dump body pivotally mounted thereon comprising: a pair of links in toggle connection, one end thereof pivotally mounted on a stationary axis on the vehicle frame and the opposite end pivotally connected to the tiltable dump body, a link at one end pivotally connected to a movable axis on the head end of a power actuated reciprocable ram and at its opposite end upon an axis eccentric to the toggle joint of said toggle links, and a second link having one end pivotally connected to the movable axis on the head end of the ram and at an opposite end on said frame co-axially with the axis connecting the end of the toggle links with the frame.

5. The combination of a frame of a motor vehicle having a dump body pivotally mounted thereon comprising: a pair of links in toggle connection, one end thereof pivotally mounted on a stationary axis on the vehicle frame and the opposite end pivotally connected to the tiltable dump body, a link at one end pivotally connected to a movable axis on the head end of a power actuated reciprocable ram and at its opposite end upon an axis eccentric to the toggle joint of said toggle links, and a second link having one end pivotally connected to the movable axis on the head end of the ram and at an opposite end on said frame.

6. In a motor vehicle including a frame and having a tiltable dump body pivotally mounted thereon, a hoist mechanism for tilting said body, comprising: a pair of levers having their ends pivotally joined to form a toggle joint, one of said levers having its opposite end pivotally connected to the frame and disposed substantially in a horizontal plane when the dump body is in lowered position and the second lever disposed at an angle to the first with its opposite end pivotally connected to the dump body, a connecting link for actuating said toggle levers, said link having an end pivotally connected to the second toggle lever at a point eccentric to the pivotal joint of the levers, a crank arm pivotally connected to the frame and having its opposite end pivoted to said connecting link, and a power cylinder having a ram pivotally connected to said connecting link and crank arm for actuating said link and toggle levers to tilt the body to a dumping position.

7. A combination of a motor vehicle frame having a tiltable body and an approximately horizontal cylinder pivotally connected to the vehicle chassis and provided with a ram, a pair of lift link systems relatively at opposite sides of the piston having pivotal connection with the head of the ram, vehicle frame and dump body, each link system comprising: a single link and a pair of companion links in toggle connection, one end of said pair of links pivotally mounted on a stationary axis on the vehicle frame and the opposite end of said single link pivotally connected to the tiltable dump body, a pair of companion links at one end pivotally connected to a movable axis on the head end of a power actuated reciprocable ram and at the opposite end pivotally connected to and at relative opposite sides of the single link of the toggle connecting with the dump body, and a single link in alignment with the single link of said toggle having one end pivotally connected to the movable axis on the head end of the ram intermediate of said pair of links connecting with the ram and at an opposite end on said frame, intermediate of said pair of companion links of the toggle.

8. A lift system of linkage comprising: a pair of links at one end pivotally connected to a common stationary axis on a support, the opposite end of one link pivotally connected to a movable axis on the head end of a reciprocable ram and the opposite end of the second link of said pair pivotally connected to one end of a third link having its opposite end pivotally connected to a tiltable body to elevate the same, and a fourth link having one end pivotally connected to the movable axis on the head end of the ram and its opposite end to the end of said third link eccentric to the axis connecting said third link to the second.

9. The frame of a vehicle having a dump body tiltably mounted thereon and a hydraulic ram for tilting said dump body in combination with a system of links pivotally connecting said ram and dump body respectively to the frame and said ram and dump body, comprising: a link connecting the ram to the frame, a pair of links at one end pivotally connected together and at their opposite ends respectively pivotally connecting one with the dump body and the second to the frame on the axis with said link connecting the ram to the frame, and a link at one end pivotally connecting with said ram coaxially with said first link and at its opposite end with the link of said pair of links connecting with said dump body and at an offset relation to the pivotal axis connecting said pair of links.

10. The frame of a vehicle having a dump body tiltably mounted thereon and a hydraulic ram for tilting said dump body in combination with a system of links pivotally connecting said ram and dump body respectively to the frame and said ram and dump body, comprising: a link connecting the ram to the frame, a pair of links at one end pivotally connected together and at their opposite ends respectively pivotally connecting one with the dump body and the second to the frame, and a link at one end pivotally connecting with said ram and at its opposite end with the link of said pair of links connecting with said dump body and at an offset relation to the pivotal axis connecting said pair of links.

PERRY A. BRICK.